UNITED STATES PATENT OFFICE.

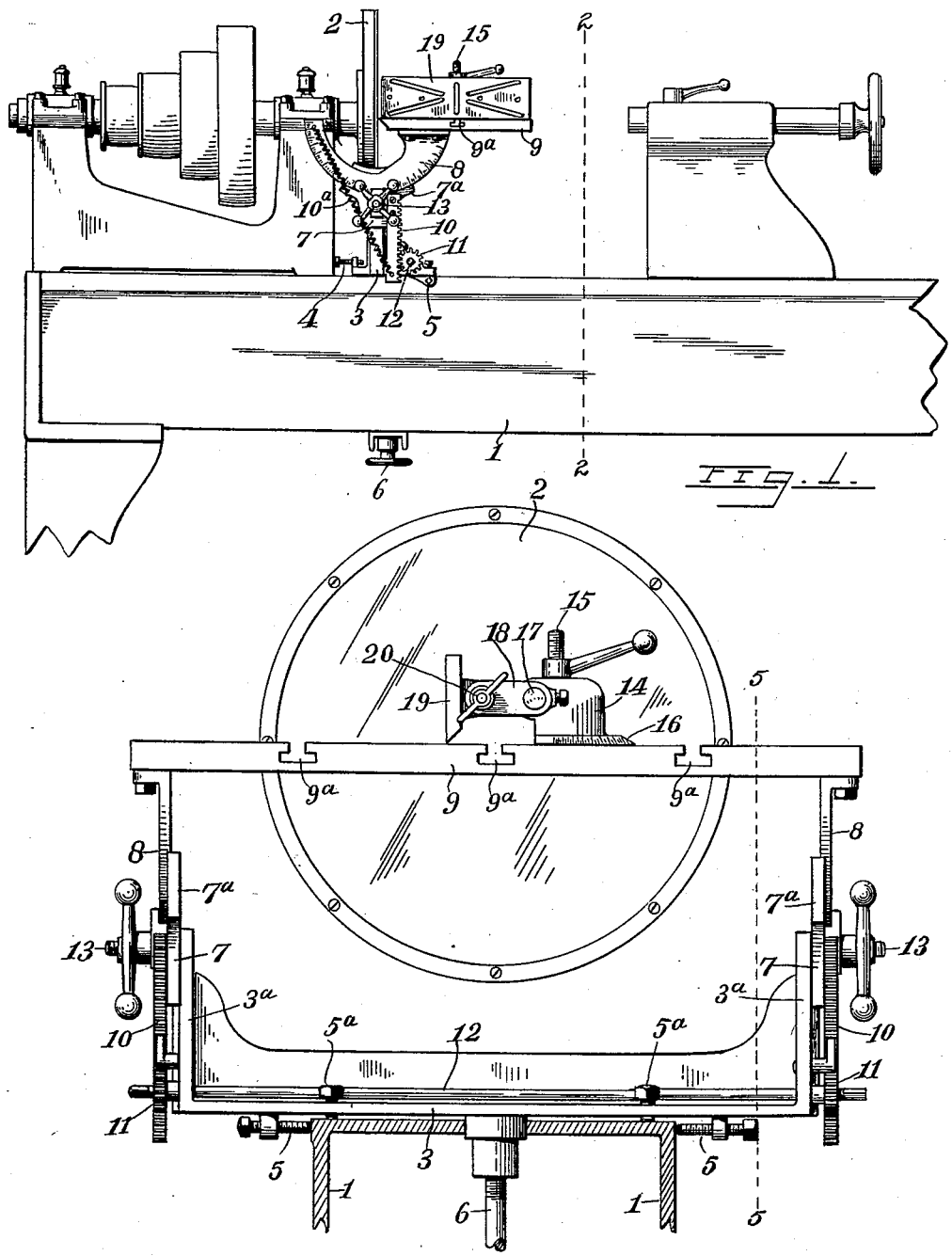

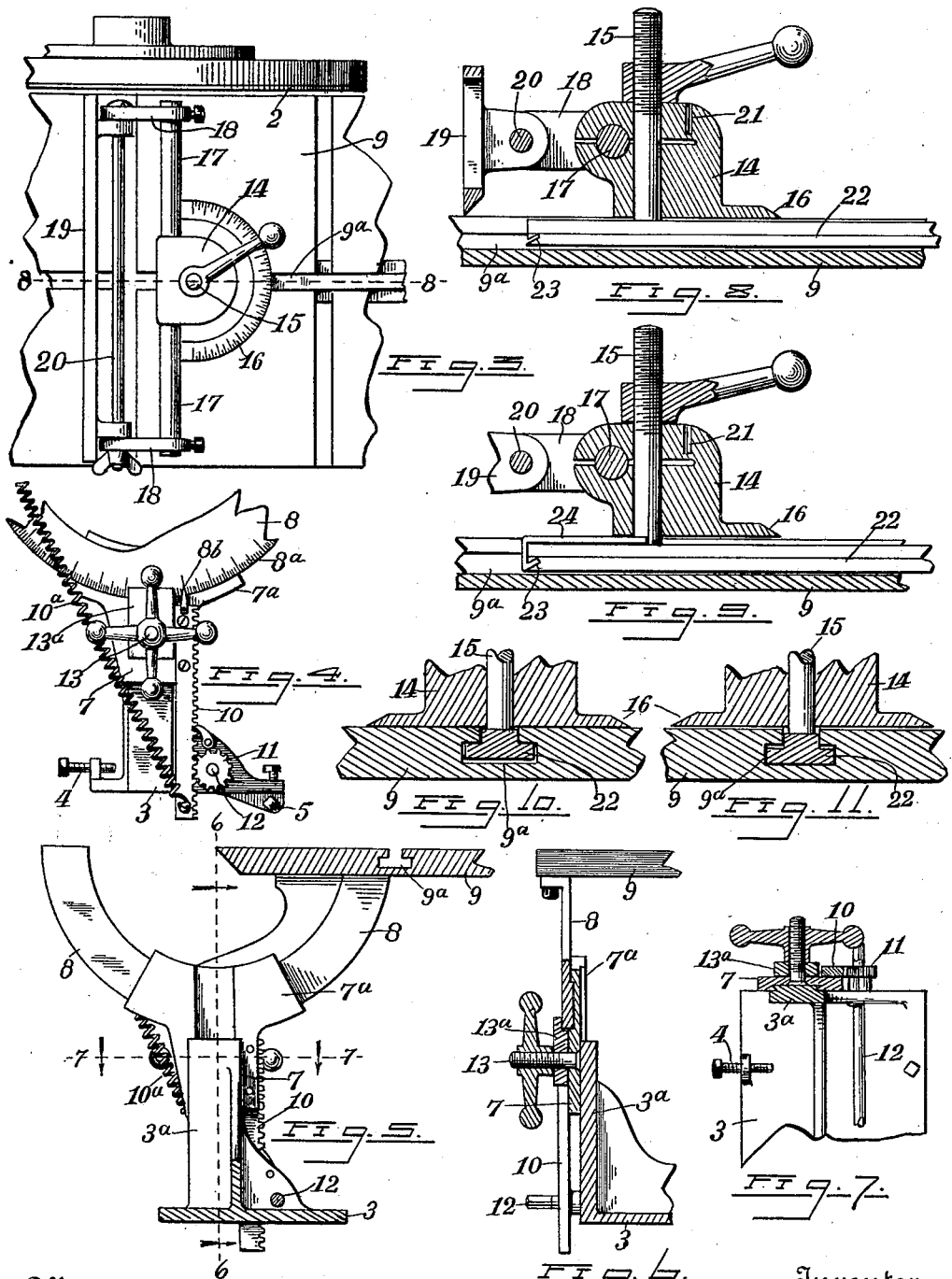

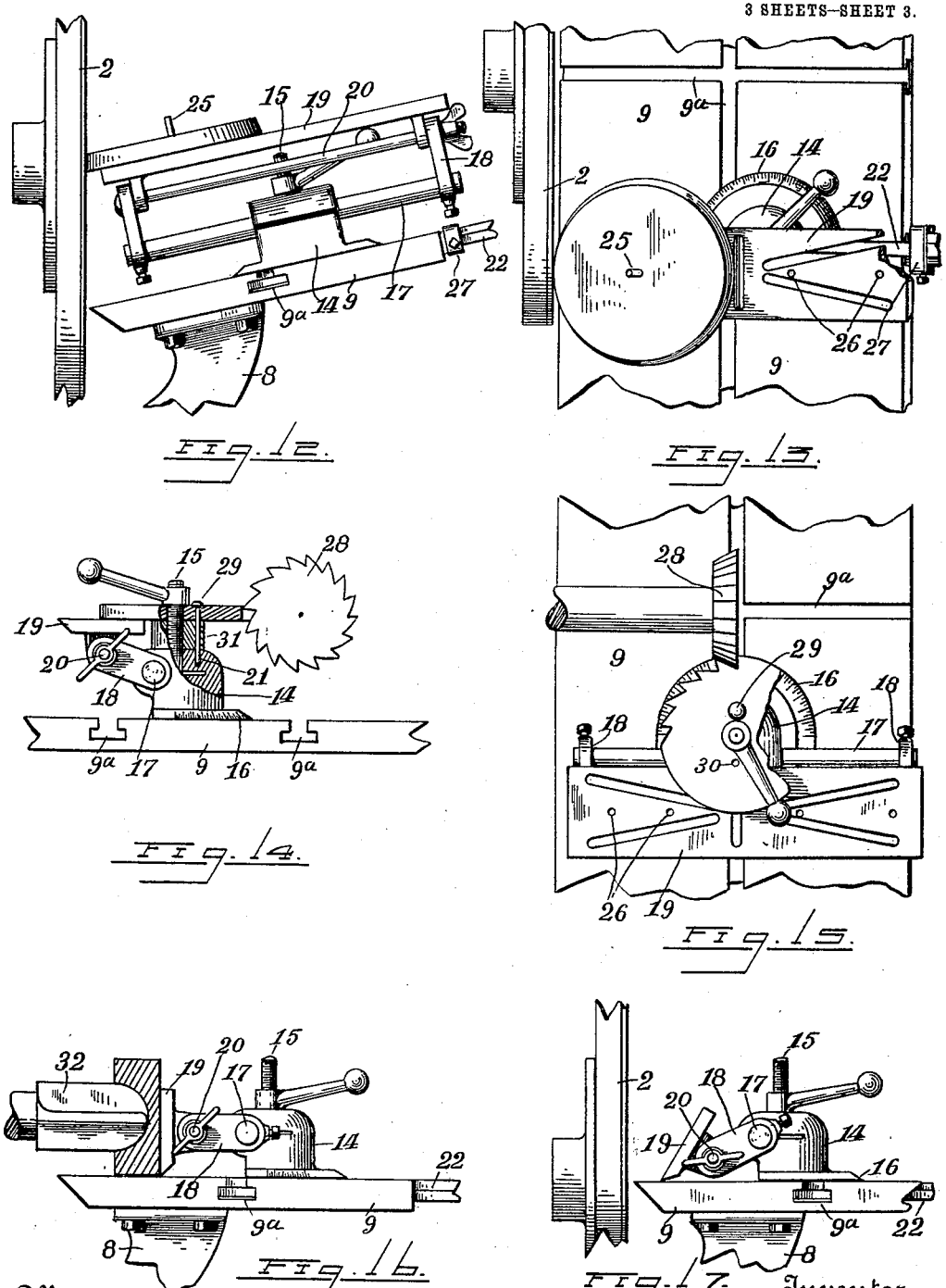

GEORGE H. NICHOLS, OF GRAND RAPIDS, MICHIGAN.

LATHE ATTACHMENT.

999,671. Specification of Letters Patent. Patented Aug. 1, 1911.

Application filed November 14, 1910. Serial No. 592,215.

*To all whom it may concern:*

Be it known that I, GEORGE H. NICHOLS, a citizen of the United States of America, residing at Grand Rapids, in the county of Kent and State of Michigan, have invented certain new and useful Improvements in Lathe Attachments; and I do hereby declare the following to be a full, clear, and exact description of the invention, such as will enable others skilled in the art to which it appertains to make and use the same.

My invention relates to improvements in lathe attachments, and its object is to provide a convenient attachment for lathes or like machines, and more particularly for pattern makers' lathes, whereby a great variety of work may be properly adjusted and held in relation to a rotating tool or cutter mounted on the lathe arbor.

My invention consists essentially of a table adjustably mounted on the lathe bed, means for variously adjusting the said table, and a guide or holder mounted on the table and adjustable thereon, together with certain features of construction and arrangement, whereby a great variety of work can be held adjusted or guided as occasion may require, as hereinafter more fully described and particularly pointed out in the claims, as will more fully appear by reference to the accompanying drawings, in which:

Figure 1 is a front elevation of a lathe with my device applied thereto; Fig. 2 an enlarged view showing the lathe bed in vertical section on the line 2—2 of Fig. 1 and my device in elevation at right angles to Fig. 1; Fig. 3 a plan view of my device with parts broken away; Fig. 4 a detail in front elevation corresponding to a portion of Fig. 1 enlarged; Fig. 5 a detail showing the inner side of one end of my device with parts removed; Fig. 6 a vertical section on the line 6—6 of Fig. 5; Fig. 7 a horizontal section on the line 7—7 of Fig. 5; Fig. 8 a detail in vertical section on the line 8—8 of Fig. 3; Fig. 9 the same with an attachment for permitting the head to slide freely on the table; Fig. 10 a transverse section showing a detail of a portion of the head and clamping bolt; Fig. 11 the same with the attachment shown in Fig. 4 therein; Fig. 12 a side elevation of my device adjusted for conical work; Fig. 13 a plan view of the same; Fig. 14 a detail partially in section of my device adjusted for cutting ratchet teeth in a pattern; Fig. 15 a plan view of the same; Fig. 16 a detail showing my device adjusted for cutting core boxes; and Fig. 17 a detail showing my device adapted for sand papering beveled work.

Like numbers refer to like parts in all of the figures.

1 represents the bed of an ordinary pattern maker's lathe; 2 a sand papering disk mounted on the lathe arbor. This disk is obviously removable and various other cutting or polishing tools may be attached in place thereof; as for instance, the ratchet tooth cutter 28 shown in Figs. 14 and 15, or a suitable cutter for forming a half round channel, such as 32 in Fig. 16. Obviously a boring tool might also be substituted, as well as various other rotary tools as occasion may require.

My device consists of a main frame 3 extending transversely of the lathe bed and adjustable thereon by means of screws 4 to adjust the distance from the head, screws 5 to adjust the frame transversely of the bed, and screws $5^a$ to level the frame. A binding screw 6 holds the frame securely in place on the bed. At each end of this frame is a vertical dove-tailed way $3^a$ on each of which is a vertically adjustable slide 7 having a segmental head $7^a$, in which head is adjustable a segment 8 about its axis. This segment is held adjusted by a clamp $13^a$ forced in contact therewith by a bolt 13. This segment is provided with a scale of degrees $8^a$ and an index $8^b$ to indicate the adjustment of the segment.

The slides 7 are simultaneously adjusted on the ways 3 by means of a rack 10 on each slide engaged by a pinion 11 mounted on a shaft 12 to which shaft may be applied any suitable crank for rotating the same, thus raising or lowering the heads 7 together with the parts supported thereby. On one end of the segments 8 is mounted a table 9 provided with longitudinal and transverse slots $9^a$, one of which slots extends in line with the axis of the lathe. In any one slot may be inserted a slide 22 provided with a vertically projecting bolt 15 on which is rotatively mounted a head 14 provided with a horizontal slot extending nearly through the same and through the axis of a shaft 17, rotatively adjustable in the slot, and held from moving therein when the bolt is tightened down on the head.

On each end of the shaft 17 is rigidly mounted an arm 18 and these arms carry a guide blade 19 pivoted thereon and held in adjustment by a bolt 20 extending through the movable ends of the arms and through lugs on the blade 19. By this arrangement the guide blade 19 can be adjusted vertical as in Fig. 8, inclined as in Fig. 17, or horizontal as in Fig. 14. The head 14 is provided with a flange 16 at the base having thereon a scale of degrees whereby the head can be adjusted about the vertical axis of the bolt 15 to adjust the blade parallel with the face of the disk 2, or at right angles thereto, or at any angle between these two positions.

For some purposes it is desirable that the head should be freely slidable in the direction of the T-slot and at the same time fixed from rotating about the axis of the bolt 15. For this purpose a plate 24 of sufficient thickness to raise the head clear of the table is inserted between the head and the slide 22. This plate is provided at one end with a hook which engages a recess 23 in the slide and thus holds the plate in fixed relation thereto.

To limit the movement of the head toward the wheel 2, a stop consisting of an adjustable clamp 27 is attached to the slide 22 and engages the rear of the table 9. To sand paper circular work a pin 25 is provided to extend through an opening in the axis of the work to journal the same on the blade 19, which blade is provided with openings 26 to receive the pin and the blade adjusted horizontally. If the work is to be tapered, the table 9 can be adjusted inclined to the axis of the lathe by adjusting the segments as indicated in Figs. 12 and 13.

For cutting ratchet teeth or other like recesses in a wheel pattern a suitable tool 28 is mounted in the spindle of the lathe, the blade 19 adjusted horizontally, a block 31 of such thickness that its upper surface will be in the same plane with the upper surface of the blade 19 is placed on the bolt 15, and a hole in the axis of the work is made to mount the same on the bolt 15. The work is also fixed relative to the head by a pin 29 extending through the work and the block and into a hole 21 in the head. The head can then be adjusted step by step about the axis of the bolt 15 at regular intervals by means of the scale 16 and the head moved toward the cutter with the stop 27 limiting this movement to cut the teeth in the ratchet of uniform depth, as illustrated in Figs. 14 and 15.

For cutting core boxes a suitable cutter 32 is placed in the lathe spindle and the guide blade 19 adjusted at proper distance therefrom and in a vertical plane at right angles to the axis of the cutter to properly guide the work to the cutter which forms a semicylindrical channel therein by sliding the work between the blade 19 and the cutter, as illustrated in Fig. 16. To counter-balance the weight of the table and parts supported thereby, a contractile spring $10^a$ is connected to the end of the segment at one end and to the rack 10 at the other end. In cutting teeth in wheels, as in Figs. 14 and 15, the table is raised and lowered during the cutting to make the cut parallel, and if draft or taper is to be put in the teeth, the table is adjusted inclined to the horizontal.

What I claim is:—

1. A lathe attachment, comprising a frame adapted to be attached to a lathe bed and having vertical ways, slides adjustable in the ways, segments carried by the slides and adjustable thereon, a table mounted on the segments, a head adjustably mounted on the table, and a guide blade adjustably mounted on the head.

2. A lathe attachment, comprising a frame, means for adjustably securing the frame to a lathe bed, a vertical way at each end of the frame, slides adjustable in the ways, segments adjustably mounted on the slides, a table mounted on the segments, a guide blade adjustably mounted on the table, racks attached to the slides, a shaft journaled in the frame, and pinions on the shaft engaging the racks.

3. A lathe attachment, comprising a frame having vertical ways on its respective ends, slides vertically adjustable in the ways, a table adjustably mounted on the slides, adjusting screws in the frame to engage a lathe and adjust the frame thereon, and a binding screw to hold the frame on the lathe.

4. A lathe attachment, comprising a frame adapted to be mounted on a lathe, screws in the frame for adjusting it on the bed, vertical ways at the respective ends of the frame, slides vertically movable in the ways, segmental heads on the slides, segments adjustable in the heads, a bed mounted on the segments, a blade adjustable on the bed, racks attached to the slides, counterbalanced springs connected to the racks and segments, pinions engaging the racks, and a shaft journaled in the frame and carrying the pinions.

5. A lathe attachment, comprising a frame adapted to be mounted on a lathe, a bed adjustably supported on the frame, longitudinal and transverse slots in the bed, a slide adapted to be inserted in the slots, a bolt extending upward from the slide, a head rotatively mounted on the bolt, a horizontal shaft adjustable in the head, arms fixed on the ends of the shaft, and a guide blade carried by the arms.

6. A lathe attachment, comprising a frame adapted to be mounted on a lathe, a bed adjustably supported on the frame, a T-slot in the bed, a slide in the T-slot, a bolt extending upward from the slide, a head rotatively mounted on the bolt, a guide blade carried by the head, and a plate inserted between the head and the slide to raise the head clear of the bed.

7. A lathe attachment, comprising a frame adapted to be mounted on a lathe, a bed carried by the frame and provided with a T-slot, a slide in the T-slot, a bolt extending upward from the slide, a head rotative on the bolt, a shaft adjustable in the head, arms fixed on the respective ends of the shaft, and a guide blade pivoted to the arms and adjustable to vertical or horizontal position relative to the bed.

8. A lathe attachment, comprising a frame adapted to be mounted on a lathe, segments adjustably supported on the frame, a bed carried by the segments and adjustable horizontal or inclined and having a T-slot therein, a slide longitudinally movable in the slot, a stop on the slide to limit its movement, a bolt mounted on the slide, a head mounted on the bolt, a guide blade carried by the head and adjustable horizontal, and a pin in the guide blade on which the work is rotatively mounted.

9. A lathe attachment, comprising a frame adapted to be mounted on a lathe, a bed adjustably supported on the frame and having a T-slot therein, a slide in the T-slot, a bolt extending upward from the slide, a head rotatively mounted on the bolt and having a scale of degrees at the base, a guide blade mounted on the head and adapted to be adjusted horizontal to support the work, a block on the bolt having its upper surface in the plane of the blade, and a pin adapted to extend through the work and also through the block and into an opening in the head.

In testimony whereof I affix my signature in presence of two witnesses.

GEORGE H. NICHOLS.

Witnesses:
PALMER A. JONES,
LUTHER V. MOULTON.

---

Copies of this patent may be obtained for five cents each, by addressing the "Commissioner of Patents, Washington, D. C."